Aug. 1, 1933.  W. J. SMITH  1,920,768
APPARATUS FOR OPERATING ON SPINNING FRAMES AND OTHER MACHINES
Filed Dec. 31, 1928   5 Sheets-Sheet 1
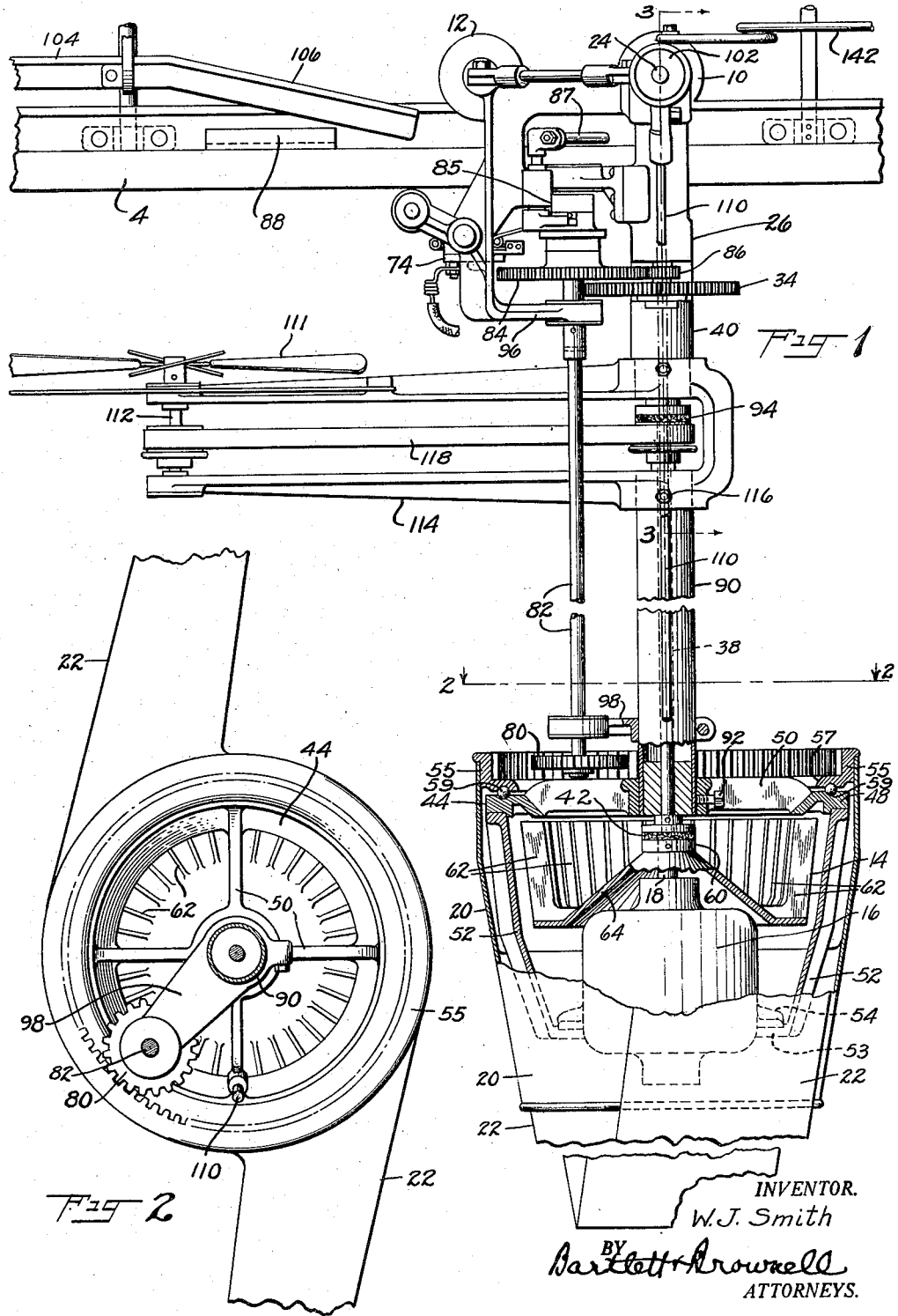
INVENTOR.
W. J. Smith
BY Bartlett & Brownell
ATTORNEYS.

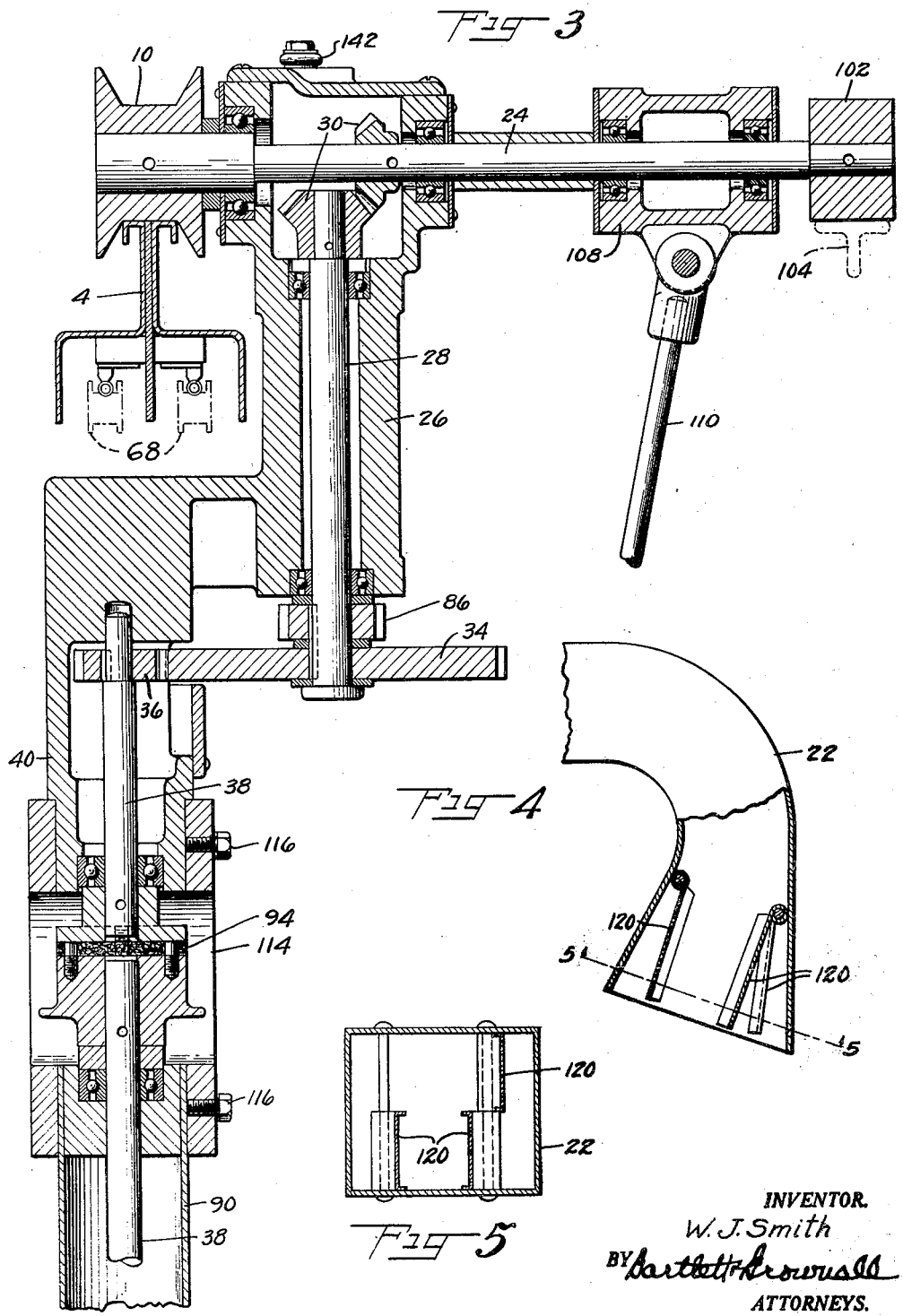

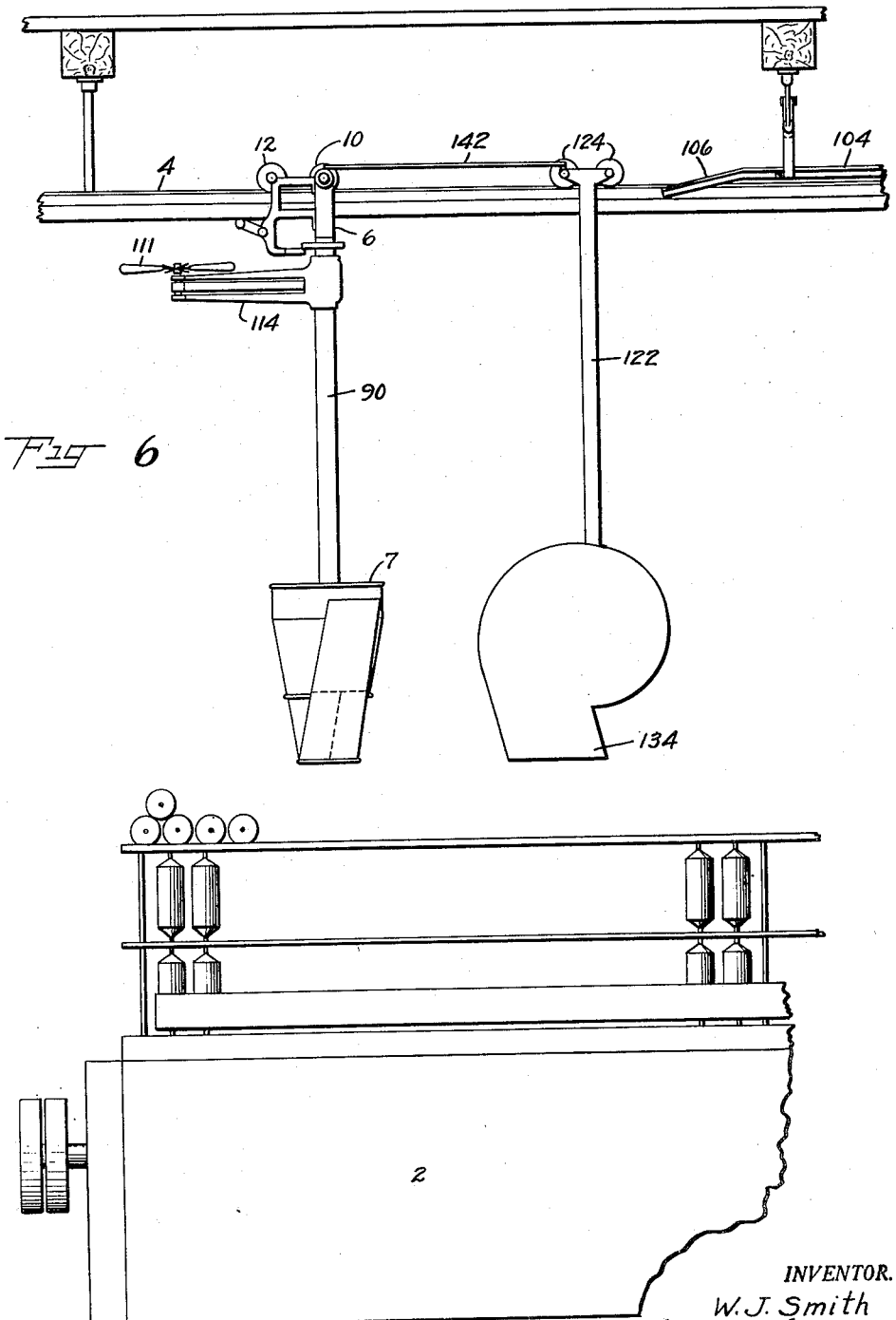

Aug. 1, 1933.  W. J. SMITH  1,920,768
APPARATUS FOR OPERATING ON SPINNING FRAMES AND OTHER MACHINES
Filed Dec. 31, 1928  5 Sheets-Sheet 4
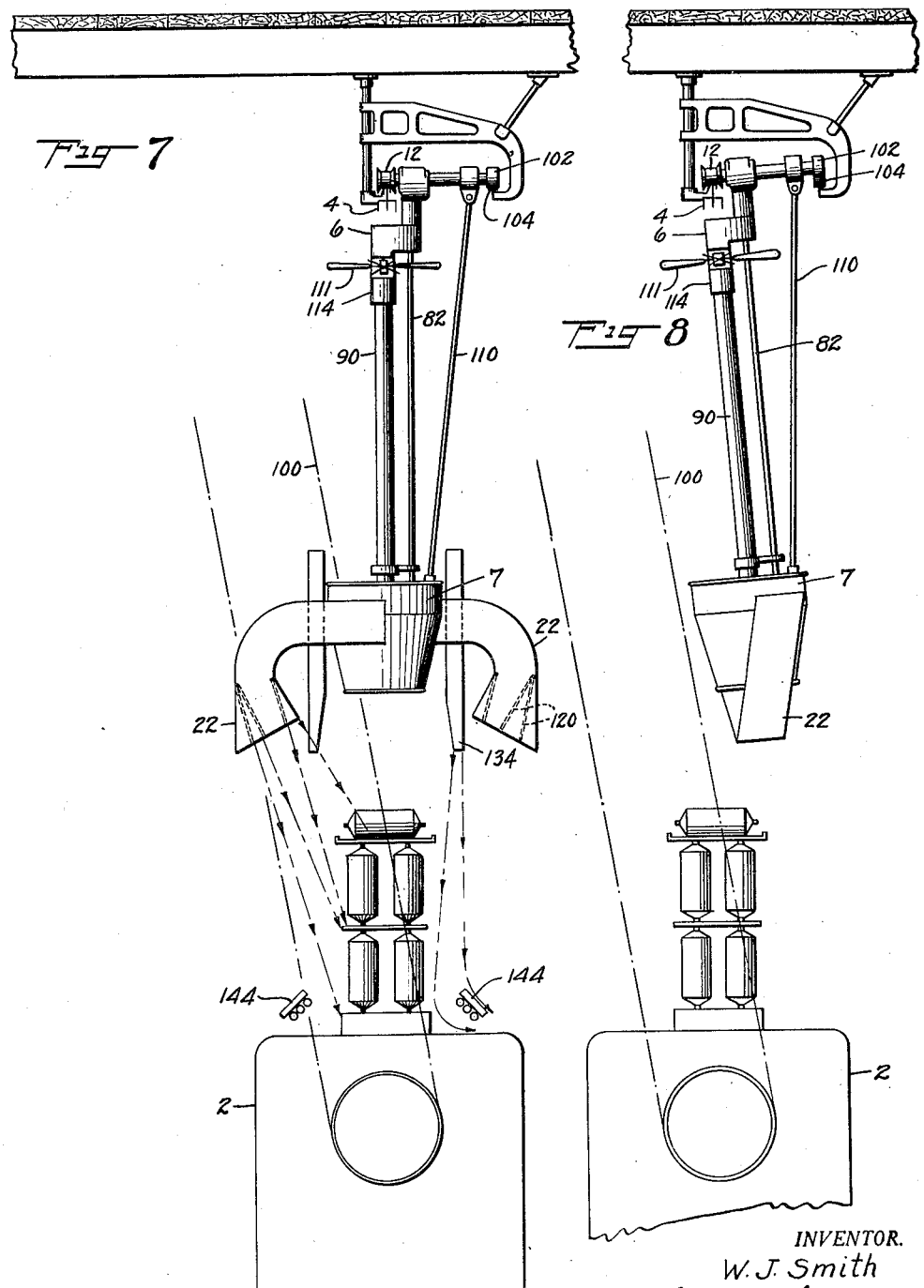
INVENTOR.
W. J. Smith
BY Bartlett Brownell
ATTORNEYS.

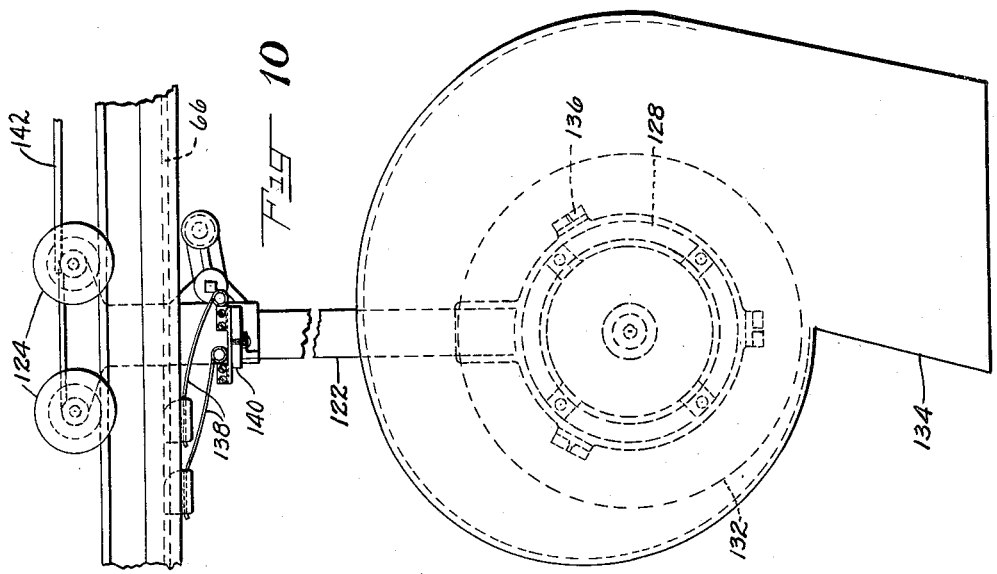
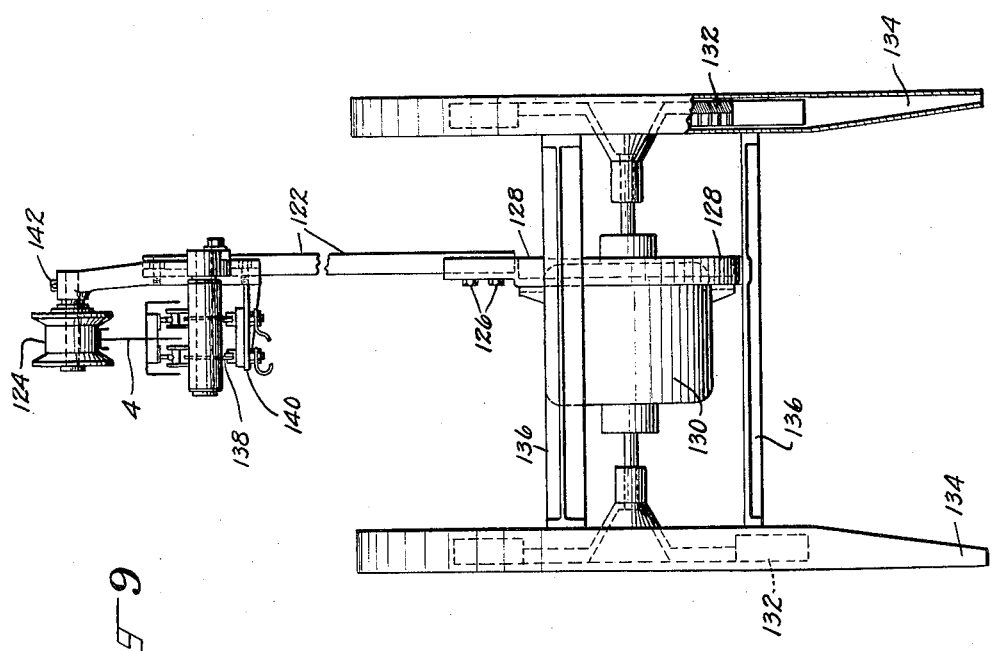

Patented Aug. 1, 1933

1,920,768

UNITED STATES PATENT OFFICE 1,920,768

APPARATUS FOR OPERATING ON SPINNING FRAMES AND OTHER MACHINES

William J. Smith, Brockton, Mass., assignor to Firth-Smith Company, Boston, Mass., a Corporation of Massachusetts Application December 31, 1928
Serial No. 329,421

17 Claims. (Cl. 15—20)

My invention relates to apparatus for operating upon spinning frames and other machines, and has special reference to apparatus for removing dust and other fine particles from the machines and maintaining them substantially free of such deposits.

The object of the invention is to generally improve the construction and mode of operation of machines of this character as will hereinafter appear.

With this object in view, the features of the invention consist in certain constructions, arrangements and combinations of parts hereinafter described and claimed, the advantages of which will be obvious to those skilled in the art.

The several features of the invention will be clearly understood from the following description and accompanying drawings, in which:

Figure 1 is a side view, partly in section and partly broken away to save space, of a portion of an apparatus embodying the features of the invention in their preferred form;

Fig. 2 is a sectional plan view taken on the line 2—2 of Fig. 1;

Fig. 3 is a vertical sectional view, on an enlarged scale, taken on the line 3—3 of Fig. 1;

Fig. 4 is a sectional view of a portion of one of the blower nozzles forming a component part of the apparatus;

Fig. 5 is a sectional view on the line 5—5 of Fig. 4;

Fig. 6 is a side view, partly diagrammatical, of a portion of the apparatus shown operating on a spinning frame;

Fig. 7 is a front view of the same;

Fig. 8 is a view corresponding to Fig. 7, but showing certain parts in a different position;

Fig. 9 is a front view, partly in section, of an air impelling device which may form a component part of the apparatus; and Fig. 10 is a side view of the same.

The apparatus illustrated in the drawings is of the type of the one described and claimed in the patent to Joseph J. Smith, "Apparatus for operating on spinning frames and other machines", No. 1,857,410, May 10, 1932. This apparatus is particularly adapted for use in operating upon spinning frames, one of which is indicated at 2 in Figs. 6, 7 and 8, which are usually arranged in parallel rows with the frames of each row arranged end to end. The apparatus is provided with an endless track 4 which extends centrally over the machines of each row. The apparatus is further provided with a carriage 6 and an air propelling device in the form of a blower 7 mounted thereon, and the carriage is propelled along the track by power operated means so as to cause the blower to operate successively upon the machines of each row and upon the several rows of machines successively, so that each machine is operated upon uniformly at predetermined intervals. The carriage 6 is suspended from flanged sheaves or wheels 10 and 12 mounted on the track, and the air impelling means is provided with a fan 14 and an electric motor 16 having its shaft 18 arranged vertically. The fan 14 and motor 16 are enclosed by a sheet metal cylindrical casing 20 which may have its lower end closed and is provided with laterally extending air directing arms 22 having discharge orifices suitably arranged to direct currents of air downwardly and inwardly over the sides of the spinning frames or other machines. The motor 16 through suitable connections drives the carriage wheel 10 so as to propel the carriage along the track, and also drives the fan 14. The driving connection between the wheel 10 and the motor shaft comprises a horizontal shaft 24 that carries said wheel, and extends through and is journaled in suitable ball-bearings in the bifurcated upper end of a vertically arranged post or hanger 26 forming a part of the carriage 6. A vertical shaft 28 extends through the post or hanger 26 and has its upper end operatively connected with the wheel shaft 24 through bevel gears 30. The lower end of the vertical shaft 28 carries a spur gear 34 which is operatively engaged by a pinion 36 secured on the upper end of a vertical shaft 38 that extends through a depending post or hanger 40 cast integral with the post or hanger 26. The vertical shaft 38 is in axial alinement with the motor shaft 18 and is detachably connected therewith by means of a flexible coupling 42. A spider 44 supports the electric motor 16, fan 14 and fan casing. The spider is provided with an outer annulus or rim 48 which is connected with the hub of the spider by a series of four radial arms 50, and is further provided with depending bracket arms 52 that are connected at their lower end by an annulus 53 which supports lugs 54 projecting from the motor casing.

The upper annulus 48 of the spider 44 supports the nozzle casing 20. To provide for this, an annular member 55 is secured to the inside of the upper end of the cylindrical central portion of the casing and is provided with a horizontal inwardly directed flange 57 that extends over the outer portion of the annulus 48. The flange 57 and annulus 48 are provided with opposed annular grooves forming a raceway for ball-bearings 59 so that the blower casing may be turned from its normal widthwise position to endwise position to permit it to clear a belt or other obstruction in its path as hereinafter described.

The fan 14 is provided with a hub 60 which is secured on the upper end of the motor shaft 18, and is further provided with suitably formed blades 62 that are connected at their lower ends to an upwardly and downwardly flaring web 64 projecting from the fan hub 60.

To energize the electric motor 18, trolley wires 66 are mounted at opposite sides of the track 4. These trolley wires are engaged by trolleys 68 (indicated by broken lines in Fig. 3) which are suitably mounted on a bracket plate 74 projecting from the blower carriage, the trolley being electrically connected with the motor 18.

The means for turning the blower casing 20 to permit it to clear an obstruction in its path comprises gear teeth formed on the annular member 55 which are engaged by a gear 80 secured on the lower end of a vertical shaft 82. A gear 84 is loosely mounted on the upper end portion of the shaft 82 and is driven by a pinion 86 on the shaft 28. The gear 84 is adapted to be clutched to the shaft so as to cause the shaft to turn the gear 80 and thus turn the blower casing 20, by means of a suitable clutch 85 having a control member 87. An abutment plate 88 is secured on the track 4 in the path of the free end of the control member 87 and in proper position with relation to the belt or other obstruction in the path of the blower, so that as the blower approaches the obstruction the control member 87 by engagement with the abutment plate is caused to swing in a direction to throw in the clutch so as to establish driving connection between the gear 84 and the shaft 82. When the shaft 82 has operated to turn the blower casing ninety degrees in one direction so as to change the position of the casing from widthwise to endwise of the row of machines, the clutch is automatically thrown out. As the blower passes the belt or other obstruction the end of the control member 87 engages a second abutment plate which causes the member to be swung in a direction to again throw in the clutch so as to further rotate the blower casing another ninety degrees to return it to its normal widthwise position, whereupon the clutch is again thrown out and the nozzle casing is held in this position until it approaches another obstruction in its path.

Except as hereinafter described the parts above referred to may be and preferably are the same as the corresponding parts of the apparatus forming the subject matter of said patent to Joseph J. Smith, No. 1,857,410.

In apparatus of the character of the one above referred to, it is desirable that the endless track shall be positioned as close to the ceiling of the room in which the machines to be operated upon are located as possible, but it is, of course, essential that the blower shall be spaced the proper distance above the machines to obtain the best results, the proper spacing of the blower from the machines varying under different conditions. In accordance with the present invention, the track may be located at any desired height, while still maintaining the blower in proper relation to the machines. To provide for this, an extension 90 is interposed between the supporting hanger or post 40 and the spider 44. This hanger is in the form of a tube and may have its upper end detachably secured to the lower end of the post 40 and its lower end detachably secured in the hub of the spider 44 by means of a bolt 92. Also, the upper portion of the shaft 38 is made in two sections that are detachably connected by a flexible coupling 94, the upper section being journaled in suitable bearings in the post 40 and the upper and lower ends of the lower section being journaled in bearings in the upper and lower ends of the extension 90. The shaft 82 has its upper portion journaled in a bearing in a bracket arm 96 and its lower portion extending through and journaled in a bracket arm 98 detachably secured to the extension 90, the shaft 82 being removable. With this construction, it will be apparent that by employing a proper length extension 90, shaft 38 and shaft 82, the blower may be positioned as desired with relation to the machines, and the track positioned at any desired height.

In some cases it has been found that a belt or other obstruction in the normal path of the blower is so located that the blower is unable to clear the obstruction even when it is turned so as to travel endwise as above described. Such a situation is indicated in Fig. 7 in which it will be noted that the belt 100 is so located that even though the blower were turned to its endwise position the horizontal central portion of the blower casing would strike the belt. In accordance with the present invention, however, means is provided whereby the blower may be swung laterally about an axis corresponding to the line of contact of the carriage wheels with the track so as to move the blower casing a sufficient distance to clear such obstruction as indicated in Fig. 8. To provide for this, the end of the driving carriage wheel shaft 24 at the opposite side of the hanger 26 from the driving wheel, is extended and a wheel or roller 102 is secured on its outer end. This roller 102 is adapted to ride on an auxiliary track 104 which is raised above the main track 4 and has inclined end portions 106. This auxiliary track is so located with relation to an obstruction in the path of the blower, that as the blower approaches the obstruction and as it is turned ninety degrees as above described, the roller 102 rides up on the auxiliary track 104 and thus swings the blower laterally a sufficient distance so that its central portion may clear the obstruction. After the blower passes the obstruction the roller 102 rides off of the track to permit the blower to return to normal vertical position by gravity. It will be apparent that any number of auxiliary tracks 104 may be employed depending upon the number of belts or other obstructions in the path of the blower.

The projecting end portion of the shaft 24 which carries the roller 102 extends through and is journaled in a suitable supporting bearing 108 which is secured by a tie-rod 110 having one end connected with the bearing and its other end secured to the spider 44, this construction permitting the tilting movement to be accomplished without placing undue strain upon the apparatus. Such tilting of the blower to permit the central portion of its casing to clear an obstruction in its path, in many instances does away with the necessity of providing the track with an offset portion.

The illustrated apparatus is further provided with a fan 111 which is secured on the upper end of a vertical shaft 112 that extends through and is journaled in the ends of the arms of a bifurcated bracket 114 which is secured to and interposed between the post or hanger 40 and the upper end of the extension 90, the upper end of the extension being detachably secured to the bracket by means of a bolt 116. This fan is driven by means of a belt 118 which passes over a pulley on the fan shaft 112 and a pulley carried by the lower section of the shaft 38, the upper face of the latter pulley constituting one member of the flexible coupling 94. This fan is located in proximity to the underside of the track 4 and is spaced a distance in advance of the blower.

With this construction, during the travel of the apparatus the fan 111 directs air upwardly against the underside of the track and over the trolley wires and toward the ceiling, and because of the movement of the apparatus and also because of the suction created on the top side of the blower casing, the air thus directed upwardly tends to take a more or less of a return bent course and be drawn down through the blower and towards the work. This fan, therefore, serves to maintain the track, trolley wires and ceiling free of dust and other fine particles and, also, as the humidifiers in a spinning room are located near the top of the room, the air thus propelled by the fan will be of a high degree of humidity and as it passes down through the blower it will increase the humidity of the air which is directed by the blower against the work, where the humidity is most needed.

In the illustrated apparatus, each of the air directing arms 22 has two sets of baffles 120 which have their upper ends pivotally mounted in the ends of the arms, and the two sets are arranged one behind the other (Figs. 4, 5 and 7). One set may consist of two baffles, while the other set may consist of one as shown. With this arrangement of baffles by proper adjustment thereof, two more or less contiguous streams of air may be directed from each arm as indicated in Fig. 7. The rear baffle cooperates with the inner wall of the arm to direct a stream of air downwardly and inwardly against the upper spindles or spools of the spinning frame and the forward baffles to direct a stream of air downwardly and inwardly over the other spindles or spools. It will be apparent that with the use of these baffles more definite and positive results may be obtained than where the air is directed from each nozzle in a single stream.

The air impelling device illustrated in Figs. 6, 7, 9 and 10 of the drawings is particularly adapted for use in connection with the apparatus above described. The device comprises a carriage which is made up of a depending bar 122 having wheels 124 on its upper end adapted to ride on the track 4. To the lower end of the hanger bar is secured by bolts 126, an annular frame 128 for supporting an electric motor 130 with its shaft arranged transversely of the track. A fan 132 is secured on each end of the motor shaft, and is enclosed by an air directing casing having a downwardly and rearwardly extending discharge nozzle 134. The two fan casings are secured on the ends of horizontal bars 136 which are secured to the annular frame 128. The motor is energized from the trolley wires 66 through trolleys 138 which are mounted on a bracket 140 secured to the depending bar 122. The device is adapted to be drawn along by means of a flexible rod 142 having one end secured to the upper end of the depending bar 122 and its other end secured to the blower carriage 6.

The two fan casings and their nozzles 134 are so formed as to direct thin and wide streams of air downwardly and slightly rearwardly in parallel relation, the streams traveling edgewise during the travel of the device.

This auxiliary device is particularly adapted for use on spinning frames where the work is relatively coarse and dusty. With such use of the device the two thin streams of air may be directed downwardly back of the clearer boards 144 (Figs. 6 and 7) of the spinning frame, so as to maintain the draw rolls, weight hooks and adjacent parts of the spinning frame free of accumulations of dust deposits, thus permitting the streams of air from the main blower to be directed more entirely against the work. By directing the thin wide streams slightly rearwardly as shown, and due to the travel of the device, it has been found that the accumulations are blown more or less rearwardly and fall or are blown to the floor.

As will be evident to those skilled in the art, my invention permits various modifications without departing from the spirit thereof or the scope of the appended claims.

What I claim is:

1. Apparatus of the class described having in combination, an overhead track, an air impelling device suspended from the track and adapted to travel along the track, and means acting automatically at a predetermined point in its travel to move said device laterally with relation to the track and to its normal path of travel about a pivotal point arranged adjacent the track, maintaining it thus moved for a predetermined interval of travel so as to permit it to clear an obstruction in its path and then returning it to its initial position to cause it to resume its normal path of travel.

2. Apparatus of the class described having, in combination, an overhead track, an air impelling device mounted to travel along the track, and means acting automatically at a predetermined point in the travel of the air impelling device to move said device laterally with relation to the track and to its normal path of travel, maintaining it thus moved for a predetermined interval of travel so as to permit it to clear an obstruction in its path and then returning it to its initial position to cause it to resume its normal path of travel.

3. Apparatus of the class described having, in combination, an overhead track, an air impelling device suspended from the track and adapted to travel along the track, and means acting automatically at a predetermined point in its travel to move said device laterally with relation to the track and to its normal path of travel, maintaining it thus moved for a predetermined interval of travel about a point spaced a distance above the device so as to permit it to clear an obstruction in its path and then returning it to its initial position to cause it to resume its normal path of travel.

4. Apparatus of the class described having, in combination, an overhead track, an air impelling device mounted to travel along the track, means for turning said device about a substantially vertical axis at a predetermined point in its travel, and means acting simultaneously to move said device laterally with relation to the track.

5. Apparatus of the class described having, in combination, an overhead track, an air impelling device, means for suspending said device from the track and propelling it along the track, comprising a driven shaft and a wheel carried by the shaft mounted on the track, and means for moving said device laterally with relation to said track, maintaining it thus moved for a predetermined interval of travel, and then returning it to its initial position comprising an auxiliary track and a wheel carried by said shaft adapted to ride upon said auxiliary track.

6. Apparatus of the class described having, in combination, an overhead track, an air impelling device, means for suspending said device from the track and propelling it along the track, and means for moving said device laterally with relation to said track, maintaining it thus moved for a predetermined interval of travel thereof and then returning it to its initial position, comprising an auxiliary track, and a projection carried by said device and arranged to ride upon said auxiliary track.

7. Apparatus for operating on spinning frames or other machines arranged in a room having, in combination, a track mounted at the upper part of said room, a carriage mounted to travel along the track, an air impelling device mounted on the carriage a distance below the track and in proximity to said machines, and an air impelling means mounted on the carriage in proximity to the underside of the track for directing air upwardly.

8. Apparatus for operating on spinning frames and other machines arranged in a room having, in combination, a track mounted in the upper part of said room, a carriage mounted to travel along the track, a blower mounted on the carriage a distance below the track and in proximity to said machines for directing air downwardly over the machines, and an air impelling device mounted on the carriage in proximity to the underside of the track for directing air upwardly in advance of the downwardly directed air.

9. Apparatus for operating on spinning frames and other machines arranged in a room having, in combination, a track mounted in the upper part of said room, a carriage mounted to travel along the track, an air impelling device mounted on the carriage a distance below the track and in proximity to said machines, a second air impelling device mounted on the carriage in proximity to the underside of the track for directing air upwardly, an electric motor mounted on the carriage, and driving connections between the shaft of the motor and both of said air impelling means.

10. Apparatus for operating on spinning frames and other machines arranged in a room having, in combination, a track mounted in the upper part of said room, a carriage mounted to travel along the track, air impelling means mounted on the carriage a distance below the track and in proximity to said machines, a second air propelling device mounted on the carriage in proximity to the underside of the track for directing air upwardly, an electric motor mounted on the carriage, connections between the shaft of the motor and the first mentioned air impelling device for driving said device, connections with said motor shaft for driving the carriage along the track comprising a shaft arranged vertically having its lower end connected with said motor shaft, a carriage wheel mounted on the track, and connections between the upper end of said vertical shaft and said carriage wheel, and connection between said vertical shaft and said second mentioned air propelling device for driving said device.

11. Apparatus for operating on spinning frames and other machines arranged in a row having, in combination, a blower mounted to travel over the row of machines, and air directing means associated with the blower having laterally arranged discharge orifices for directing air downwardly and inwardly over the sides of the machines, and two sets of baffles in each of said discharge orifices arranged one behind the other, adapted to be adjusted to cause the air directed by one set to impinge against the sides of the machines at a different angle than the air directed by the other set.

12. Apparatus for operating on spinning frames and other machines arranged in a room having, in combination, a track arranged in the upper part of the room, a carriage mounted to travel along the track, an air impelling device, means for supporting said air impelling device from said carriage comprising a support on which the air impelling device is mounted, and a tubular hanger having its upper end detachably secured to said carriage and its lower end detachably secured to said air impelling device, an electric motor mounted on said support, and connections with said motor shaft for propelling the carriage along the track comprising a vertical shaft extending through said tubular hanger, detachable connection between the lower end of said shaft and said motor shaft, a carriage wheel mounted to ride on the track, and a detachable connection between the upper end of said vertical shaft and said carriage wheel for driving said wheel.

13. Apparatus of the class described having in combination, an overhead track, a carriage mounted to travel along the track, air impelling means mounted on the carriage, an electric motor mounted on the carriage, connections with the shaft of the motor for driving said air impelling means and for propelling the carriage along the track, a second carriage mounted on the track a distance behind the first mentioned carriage, connection between the two carriages for causing the second mentioned carriage to be drawn along with the first mentioned carriage, an electric motor mounted on the second mentioned carriage, and connection between the shaft of the second mentioned motor and the second mentioned air impelling device for operating said device.

14. Apparatus of the class described having, in combination, an overhead track, a carriage mounted to travel along the track having a depending hanger, an electric motor mounted on the lower end portion of said hanger having its shaft horizontally arranged transversely of the track, air impelling devices respectively mounted on the ends of said shaft, and a casing enclosing each of said devices having an orifice for directing the air impelled thereby downwardly.

15. Apparatus of the class described having, in combination, an overhead track, an air impelling device suspended from the track and adapted to travel along the track, and means acting automatically at a predetermined point in its travel for swinging the device laterally on the track out of its normal path of travel so as to permit it to clear an obstacle in its path.

16. Apparatus of the class described having, in combination, an overhead track, an air impelling device mounted to travel along the track, means for turning said device about a substantially vertical axis at a predetermined point in its travel, and means acting simultaneously to move said device laterally with relation to the track and to its normal path of travel and after a predetermined interval of travel in said lateral position returning it to its normal path of travel.

17. In an apparatus for operating upon a row of spinning frames or other machines, having an overhead track, and an air impelling device mounted on the track to travel over the machines in the row, the improvement which consists in said air impelling device having means for directing air downwardly in two streams over the sides of the machines, the streams being relatively thin in a direction transversely of the track and wide longitudinally of the track.

WILLIAM J. SMITH.